Patented Mar. 7, 1950 2,500,099

UNITED STATES PATENT OFFICE 2,500,099

DIAZO SULFONATE LIGHT-SENSITIVE ELEMENT CONTAINING A DIKETONE AZO COMPONENT

James M. Straley, Kingsport, Tenn., assignor to General Aniline & Film Corporation, New York, N. Y., a corporation of Delaware No Drawing. Application December 20, 1945, Serial No. 636,249

5 Claims. (Cl. 95—6)

This invention relates to photoprinting material and to a process of preparing the same.

Many processes have been suggested for the production of photoprinting material, such processes differing principally in the chemical used as the light sensitive element and in the manner of developing a dye image. The most widely known of these processes are those which are based upon the light sensitivity of aromatic diazo compounds. Other such processes include processes based upon the light sensitivity of the leuco compounds of the coal tar dyestuffs; processes based upon the oxidizing action of o-nitro groups in aromatic systems having aliphatic side chains, as for instance o-nitrophenyl lactic acid methylketone; processes based upon the light sensitivity of the o-nitro-diaminotriphenylmethane bases.

With the exception of the processes based upon the light sensitivity of aromatic diazo compounds, these suggested photoprinting processes have found no commercial adaptability either because of the instability of the compounds employed or the difficulty of developing the dye image from the undecomposed light sensitive material. The aromatic diazo compounds have found wide commercial acceptance in two well known processes which are designated respectively as the one-component or wet-development process, and the two-component or dry-development process.

In the one-component process, the aromatic diazo compound is incorporated into a light sensitive layer on the carrier which may be paper, foil, glass, textile material or a metallic surface, and after exposure under the original to be copied, is developed by contact with a solution of the coupling component necessary to produce the ultimately desired image.

In the two-component process, the aromatic diazo compound and the coupling component necessary to produce the dye image are both incorporated in the light sensitive layer on the carrier. In this case, the development of the dye image is effected after exposure by contacting the light sensitive layer with ammonia gas. When employing a diazonium salt as the light sensitive material, for optimum results, it is preferable to select those diazo compounds which are derived from aromatic p-diamines and o-aminonaphthols. Some others have been found suitable but generally premature coupling of the dye components may take place if other types of diazos are used in the light sensitive layer together with the coupling components, thus reducing the keeping quality of the coated carrier.

Diazo sulfonates will not couple with a coupling component in the absence of strong actinic light. However, they may be employed as light sensitive material in a photoprinting process as follows: a solution of a diazonium sulfonate and a coupling component is coated upon a carrier, dried, and exposed to strong actinic light under an original. The portions of the diazonium sulfonate which are exposed to the actinic light are decomposed to form a diazo compound which will couple upon development with the coupling component to give an azo dye image. The unexposed diazosulfonate will not couple and is washed out. By this method, a positive is obtained from a negative, and a negative is obtained from a positive.

Nitroso arylamides are also used as light sensitive material. They decompose upon exposure to light to a non-coupling form. The arylamide in the unexposed area will not couple until treated with alkali and then rearranges to a coupling form which combines with the azo dye component to produce the dye image. Here, positives are obtained from positives, and negatives from negatives.

The coupling components must be stable, fast to light and insensitive to alkali. They should be soluble in water or in an organic solvent, yet the dyestuff produced therefrom should be water insoluble. Only few serviceable compounds are available as coupling components, such as phenols, amines, aminophenols, pyrazolones, carbazoles, sultones, naphthols, acetoacetic acid esters, and acetanilide.

In photoprinting processes of these types, it is highly desirable to produce a copy which will have a distinctive color, for example, a dark red shade on a clear white background, so that the image will be sharp. Heretofore the maroon dye images were produced by either of two methods. One of them involves the combination of naphthalene-2-diazo-1-oxide-5-sulfonic acid and phloroglucinol. The whites of prints from this combination tend to discolor on standing. Furthermore, this particular diazo is not sufficiently light sensitive to be an efficient light sensitive medium.

The other method of producing maroon dye images involves the combination of p-phenylenediamine diazos and an arylmethylpyrazolone or a hydroxynaphthimidazole. The pyrazolones give papers which precouple badly, and the red colors from the naphthimidazoles are not pleasing.

An object is to provide photoprinting materials which contain a coupling component which will couple with a decomposed diazonium sulfonate in the light areas upon exposure to light to give an azo dye image.

A still further object of the invention is to provide a process of producing such photoprinting material.

I have discovered that valuable photoprinting material may be obtained by using, as the azo dye coupling component for a light sensitive system which depends upon the formation of an azo dye to develop the image, a diketone selected from the group consisting of 5-alkyl-1,3-cyclohexanedione and a 5,5-dialkyl-1,3-cyclohexanedione, such as 5-propyl-1,3-cyclohexanedione, 5-ethyl-5-methyl-1,3-cyclohexanedione, 5,5-dimethyl-1,3-cyclohexanedione, and 5,5-diethyl-1,3-cyclohexanedione. These diketones have good resistance to precoupling, give good red shades with diazo compounds, and may be used in aqueous or non-aqueous coatings. They may be represented by the following structural formula:

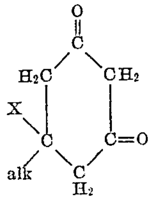

wherein X is a member of the group consisting of hydrogen and alkyl groups and alk means alkyl.

In a preferred embodiment, the process of this invention is carried out by coating a suitable base, such as paper, a cellulose or cellulose ester film, glass plate, textile material, gelatinized surface or metallic surface with a coating preparation containing the diketone, a light sensitive diazonium salt, a mild acid such as citric acid, thiourea, and water. The coating is effected in the usual manner by applying the coating solution to the surface of the carrier or base material with a doctor blade or by spraying. The coating material is then dried, exposed under an original positive or negative picture or drawing, and developed by treatment with ammonia or other suitable alkaline materials.

As a diluent for the coating solution, resinous solutions, organic solvents of high volatility such as alcohols, ethers and ketones may be employed in the place of water. Such diluents may be employed to make up the coating solution in cases where the base material or carrier is such that it will resist the penetrating and solvent action of the diluent. High temperature drying may thus be avoided.

In another manner of carrying out this process, only the light sensitive diazonium salt is added to the mild acid solution and coated onto the carrier. The exposure under a suitable positive is effected as above, but the image is developed by applying to the exposed element an alkaline developing solution containing the diketone coupling component necessary to combine with the undecomposed diazonium salt to form a dye in the unexposed areas.

In a preferred manner of carrying out this process, a diazonium sulfonate may be employed as the light sensitive material. A solution of a diazosulfonate and the diketone is coated on a suitable carrier, dried, and exposed to strong actinic light under a suitable positive or negative. The exposed diazonium sulfonate is thereby converted into a diazo component which couples with the coupling component to form an azo image upon development with gaseous ammonia or alkaline developing solutions.

Although it is not essential, it is understood that, if desired, auxiliary materials may be added to the coating solution in any of the modifications of this process, which materials may function as stabilizers, preservatives, extenders, color-intensifiers, and light sensitive intensifiers.

The following examples illustrate methods of carrying out the present invention, but it is to be understood that these examples are given by way of illustration and not of limitation.

*Example 1*

2.5 grams of 5,5-dimethyl-1,3-cyclohexanedione in 40 cc. of water and 8 grams of sulfosalicylic acid were added to a solution of 7 grams of p-phenylaminobenzene diazonium sulfate in 50 cc. of water.

The volume of the solution was then adjusted to 100 cc. with water and coated on paper. After drying, prints were made by exposure to light under a positive picture and developed with ammonia. The prints were a brilliant red on a clear white background. Prints made after storage at 38° C. and 75% relative humidity for 20 hours showed no objectionable discoloration in the background.

*Example 2*

10 grams of citric acid, 2 grams of 5,5-dimethyl-1,3-cyclohexanedione, and 1.6 grams of p-diethylaminobenzene diazonium borofluoride were made up to 100 cc. total volume in a 7% solution of cellulose acetate in acetone. The solution was coated out on cellulose acetate foil, and dried. Upon exposure to ultraviolet light under a positive picture, a brilliant red print on a clear background was obtained.

*Example 3*

10 grams of urea, 38 grams of 35% formaldehyde solution, and 10 grams of citric acid were heated one hour on the steam bath. To the resulting viscous clear solution was added 0.7 grams of the zinc chloride double salt of p-diethylaminobenzene diazonium chloride and 0.9 grams of 5,5-dimethyl-1,3-cyclohexanedione dissolved in 2 cc. of dimethylformamide. The resulting solution was coated out on paper, and allowed to dry at room temperature.

*Example 4*

A solution of 1.5 grams of 5,5-dimethyl-1,3-cyclohexanedione in 10 cc. of water was made just alkaline to litmus and added to a solution of 1.6 grams of 2,4-dimethoxy-5-chlorobenzene diazo sulfonate in 80 cc. of water. The solution volume was adjusted to 100 cc., and coated out on paper. The dried material was exposed to ultraviolet light under a positive picture giving a negative image. The undecomposed diazo sulfonate was washed out with water leaving a white image on a yellow background.

I claim:

1. A photoprinting material containing a 5,5-dialkyl-1,3-cyclohexanedione and a light sensitive diazo sulfonate.

2. A photoprinting material containing 5,5-dimethyl-1,3-cyclohexanedione and a light sensitive diazo sulfonate.

3. A photoprinting material containing 5,5-diethyl-1,3-cyclohexanedione and a light sensitive diazo sulfonate.

4. A photoprinting material containing 5-methyl-5-ethyl-1,3-cyclohexanedione and a light sensitive diazo sulfonate.

5. A photoprinting material containing a diketone of the class represented by the formula:

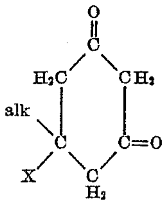

wherein alk means alkyl and X is a member of the group consisting of hydrogen and alkyl groups and a light sensitive diazo sulfonate.

JAMES M. STRALEY.

REFERENCES CITED

The following references are of record in the file of this patent:

UNITED STATES PATENTS

| Number | Name | Date |
|---|---|---|
| 1,760,780 | Krieger | May 27, 1930 |
| 2,151,532 | Schmidt | Mar. 21, 1939 |

FOREIGN PATENTS

| Number | Country | Date |
|---|---|---|
| 294,972 | Great Britain | Aug. 3, 1928 |

OTHER REFERENCES

Beilstein, "Handbuch der Organische Chemic," 4th ed. vol. 7, 1925, page 554 cited.